US012486813B2

(12) United States Patent
Ouchi

(10) Patent No.: US 12,486,813 B2
(45) Date of Patent: Dec. 2, 2025

(54) ENGINE CONTROL DEVICE

(71) Applicant: TOYOTA JIDOSHA KABUSHIKI KAISHA, Toyota (JP)

(72) Inventor: Yusuke Ouchi, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/655,526

(22) Filed: May 6, 2024

(65) Prior Publication Data

US 2025/0075669 A1 Mar. 6, 2025

(30) Foreign Application Priority Data

Aug. 29, 2023 (JP) ................................ 2023-139219

(51) Int. Cl.
*F02D 41/00* (2006.01)
*F02D 41/38* (2006.01)

(52) U.S. Cl.
CPC ......... *F02D 41/0002* (2013.01); *F02D 41/38* (2013.01)

(58) Field of Classification Search
CPC ... F02D 41/0002; F02D 41/38; F02D 41/1475
USPC .......................................................... 123/445
See application file for complete search history.

(56) References Cited

FOREIGN PATENT DOCUMENTS

| | | | |
|---|---|---|---|
| JP | 2017-172356 A | | 9/2017 |
| JP | 6638499 B2 | * | 1/2020 |

* cited by examiner

*Primary Examiner* — Logan M Kraft
*Assistant Examiner* — Joshua Campbell
(74) *Attorney, Agent, or Firm* — SoraIP, Inc.

(57) ABSTRACT

An engine control device includes that controls an air excess rate of each of N (an integer of 2 or more) cylinders by controlling an intake air amount and a fuel injection amount of each of the N cylinders; and a determination unit for determining whether or not there is a request to switch the air excess rate controlled by λ1 to λ2 different from λ1. When an affirmative determination is made by the determination unit, the control unit controls the air excess rate such that a proportion of L combustion strokes at λ2 to consecutive K (an integer greater than N) combustion strokes increases from 0% to 100% in M (an integer greater than N) steps.

6 Claims, 5 Drawing Sheets

ENGINE CONTROL DEVICE

CROSS-REFERENCE TO RELATED APPLICATION

This application claims priority to Japanese Patent Application No. 2023-139219 filed on Aug. 29, 2023, incorporated herein by reference in its entirety.

BACKGROUND

1. Technical Field

The present disclosure relates to an engine control device.

2. Description of Related Art

In four-cylinder engines, switching from a first air-fuel ratio to a second air-fuel ratio is occasionally required. In this case, the air-fuel ratios of two cylinders are switched from the first air-fuel ratio to the second air-fuel ratio. Thereafter, the air-fuel ratios of the two remaining cylinders are switched from the first air-fuel ratio to the second air-fuel ratio. Thus, a torque shock can be suppressed as compared with when the air-fuel ratios of all the cylinders are switched to the second air-fuel ratio at the same time (see Japanese Unexamined Patent Application Publication No. 2017-172356 (JP 2017-172356 A), for example).

SUMMARY

In the above-described technique, a torque shock may occur when the air-fuel ratios of the two cylinders are switched to the second air-fuel ratio.

An object of the present disclosure is to provide an engine control device in which a torque shock is suppressed.

In order to achieve the above object, an aspect of the present disclosure provides an engine control device including:

- a control unit that controls an air excess rate of each of N (an integer of 2 or more) cylinders by controlling an intake air amount and a fuel injection amount of each of the N cylinders; and
- a determination unit that determines whether there is a request to switch the air excess rate controlled to λ1 to a λ2 different from λ1, in which when an affirmative determination is made by the determination unit, the control unit controls the air excess rate such that a proportion of L combustion strokes at λ2 to consecutive K (an integer greater than N) combustion strokes increases from 0% to 100% in M (an integer greater than N) steps.

When L is a divisor of K other than 1 and other than K, the control unit may execute combustion strokes at λ2 at equal intervals.

When J obtained by subtracting L from K is a divisor of J other than 1 and other than K, the control unit may execute combustion strokes at λ1 at equal intervals.

One of the excess rates λ1 and λ2 may be 1.0 or more; the other of the excess rates λ1 and λ2 may be 1.5 or more; N may be 4 or more; and M may be 5 or more.

According to the present disclosure, it is possible to provide an engine control device in which a torque shock is suppressed.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Schematic Configuration of Engine System

Figure 1:
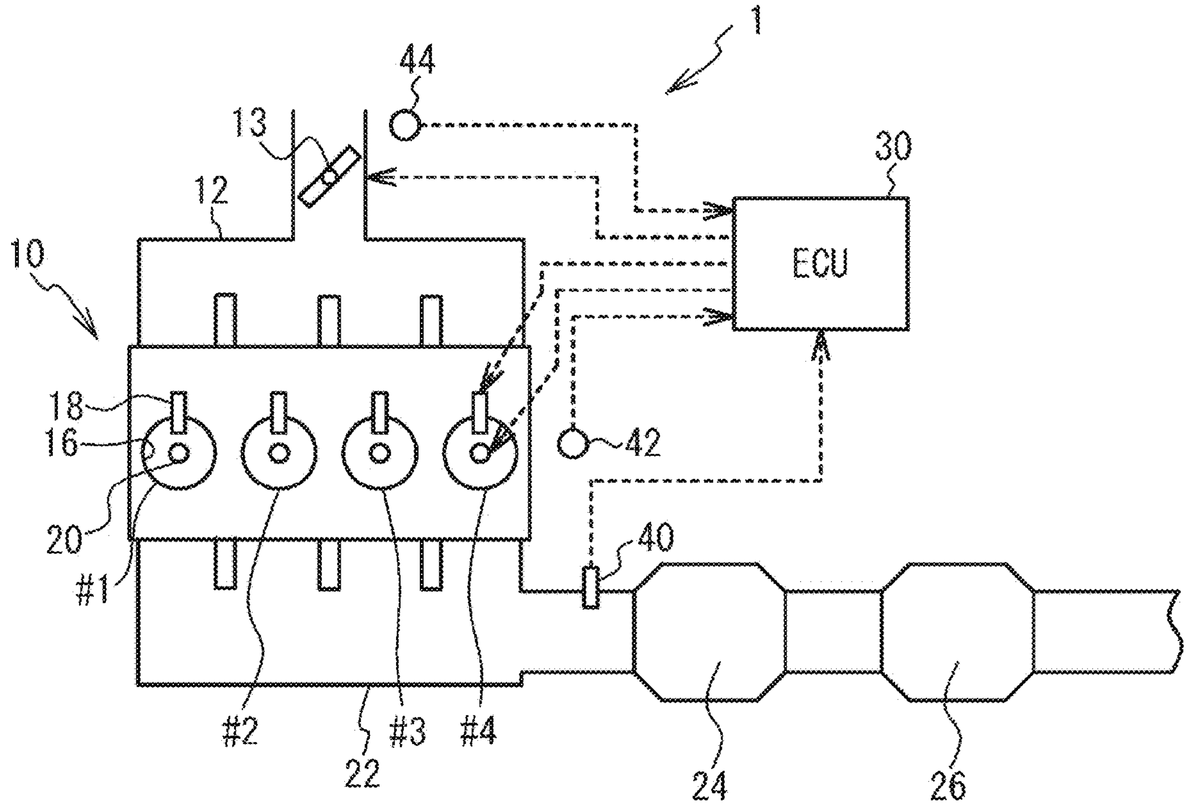
FIG. 1 is a schematic configuration diagram of an engine system.

FIG. 1 is a schematic configuration diagram of an engine system 1. The engine system 1 includes an engine 10, an intake passage 12 and an exhaust passage 22 connected to the engine 10, and a ECU (Electric Control Unit) 30 for controlling the engine 10. The engine 10 is a four-cylinder series type gasoline engine having a cylinder "1 to a cylinder #4, but is not limited to such an engine. The engine 10 may be, for example, a diesel engine. The number of cylinders of the engine 10 is not limited to four.

The intake passage 12 is provided with a throttle valve 13 for adjusting the intake air amount Ga. The air sucked from the intake passage 12 flows into the respective combustion chambers 16 of the plurality of cylinders 14. Each of the cylinder #1 to the cylinder #4 is provided with an in-cylinder injection valve 18 for injecting fuel and an spark plug 20 for generating spark discharge. The in-cylinder injection valve 18 injects fuel directly into the combustion chamber 16. In addition to the in-cylinder injection valve 18, or instead of the in-cylinder injection valve 18, a port injection valve may be provided. In the combustion chamber 16, air-fuel mixture is subjected to combustion. The air-fuel mixture subjected to combustion is discharged as exhaust gas to the exhaust passage 22. The exhaust passage 22 is provided with a three-way catalyst 24 for reducing exhaust. Further, a gasoline particulate filter (GPF) 26 is provided downstream of the three-way catalytic converter 24 in the exhaust passage 22. GPF 26 collects particulates in the evacuation.

ECU 30 controls the throttle valve 13, the in-cylinder injection valve 18, and the spark plug 20 to control the power of the engine 10. At this time, ECU 30 refers to the air-fuel ratio detected by the air-fuel ratio sensor 40 provided upstream of the three-way catalyst 24, the output signal of the crank angle sensor 42, and the intake air amount Ga detected by the air flow meter 44. ECU 30 comprises CPU (Central Processing Unit), RAM (Random Access Memory), ROM (Read Only Memory), and rewritable non-volatile memories. When CPU executes the program stored in ROM, the control of the control variable is executed.

Further, as will be described in detail later, ECU 30 controls the air excess ratio λ of each cylinder #4 from the cylinder #1 by controlling the intake air amount Ga by the throttle valve 13 and the fuel injection amount Q by each in-cylinder injection valve 18. The air excess ratio λ can be expressed as an air-fuel ratio/stoichiometric air-fuel ratio. The air excess rate λ indicates that the air-fuel ratio of the air-fuel mixture is lean as the air excess rate λ is greater than 1. ECU 30 controls the air-excess ratio λ in accordance with the required power to the engine 10. In addition, CPU, RAM, ROM of ECU 30, and the nonvolatile memories functionally implement the determination unit and the control unit. ECU 30 is an exemplary engine control device.

Air Excess Rate Switching Control

Figure 2:
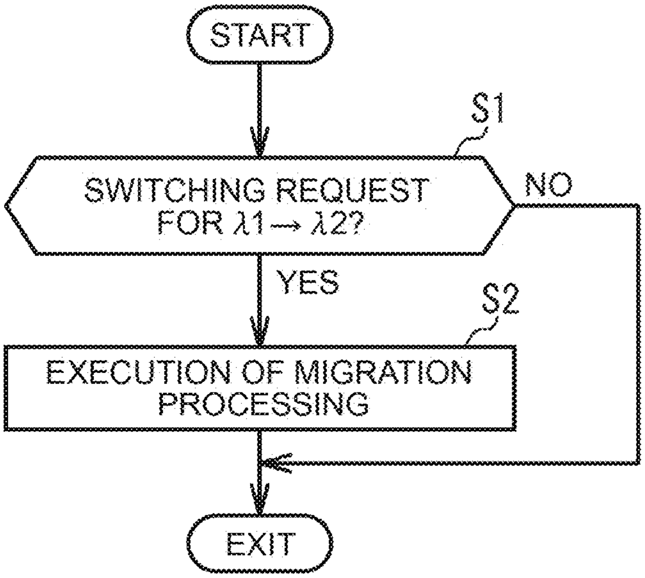
FIG. 2 is a flowchart illustrating air excess rate switching control.

FIG. 2 is a flowchart illustrating the air excess rate switching control. This control is repeatedly executed at a predetermined cycle while the ignition is on. ECU 30 determines whether or not there is a need to switch to λ2 while controlling the air-excess ratio to λ1 (S1). λ1 and λ2 are different values. One of λ1 and λ2 is greater than or equal to 1.0. The other of λ1 and λ2 is 1.5 or more. That is, S1 is determined to be Yes when there is a transition demand from one of the lean combustion and the stoichiometric combustion to the other. In addition, when there is a demand for changing the air-excess ratio while continuing the lean burn, it is determined that Yes is obtained by S1. S1 is an exemplary process executed by the determination unit. If S1 is No, this control ends.

If S1 is Yes, ECU 30 performs a migration process (S2). The transition process is a process in which the air-excess ratios of the cylinder #1 to the cylinder #4 are controlled so that the ratio R of the L combustion strokes in λ2 to the K combustion strokes consecutively performed in the engine 10 increases in the M stage from 0% to 100%. K is an integer greater than the number of cylinders N. L is an integer. M is an integer greater than N. R is a value indicating the ratio of L to K as 100 minutes. In the present embodiment, a case where N=4, K=10, M=5, and L=2, 4, 6, 8, and 10 will be described. S2 is an exemplary process executed by the control unit.

Transition Process

Figure 3:
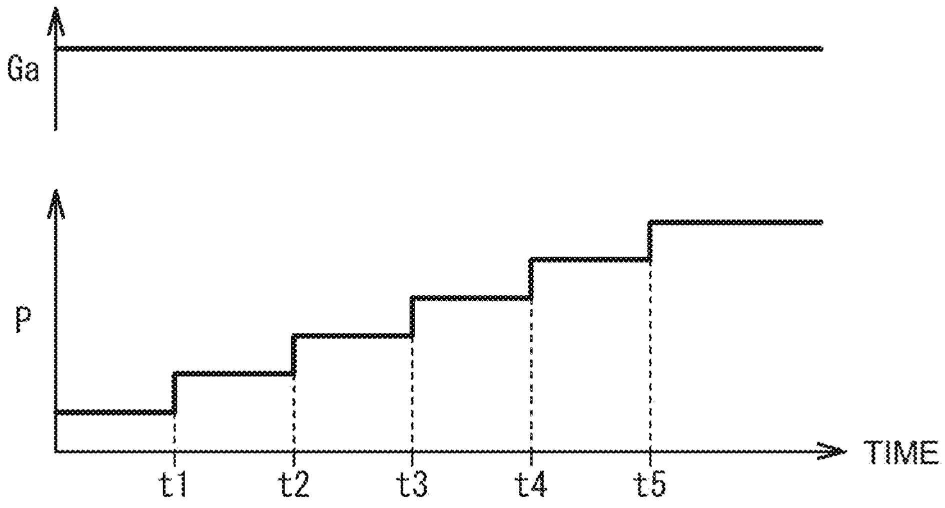
FIG. 3 is a timing chart illustrating a transition process.

FIG. 3 is a timing chart illustrating a transition process. FIG. 3 shows the transition between the intake air amount Ga and the power P. In the example of FIG. 3, there is a request for switching from λ1 to λ2 due to a request for increasing the output of the engine 10. That is, in the example of FIG. 3, λ2 is smaller than λ1. In the embodiment of FIG. 3, the air-excess ratio of the cylinder #4 is switched from the cylinder #1 by changing the fuel-injection amount Q for each cylinder #4 from the cylinder #1 while controlling the intake air amount Ga to be constant. From FIGS. 4A to 4D are explanatory diagrams showing the combustion strokes at λ1 and λ2 in the transition process. The vertical axis represents the cylinder #4 from the cylinder #1, and the horizontal axis represents the number of combustion strokes. In FIGS. 4A to 4D, the combustion stroke at λ1 is indicated by a dotted line, and the combustion stroke at λ2 is indicated by a solid line.

Figure 4A:
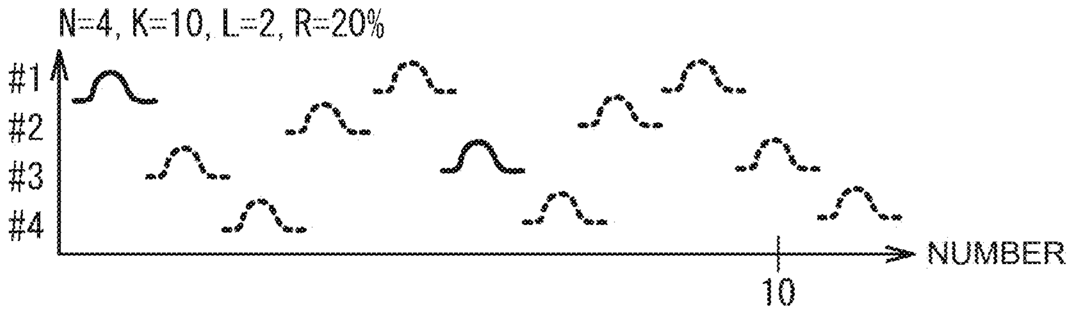
FIG. 4A is an explanatory view showing combustion strokes at λ1 and λ2 in the transfer process.

When the transition process is started in the time t1, the first process is executed. As shown in FIG. 4A, in the first process, L=2 and R=20%. Here, the cylinder #1, the #3, the #4, and the #2 are burned in this order. In the example of FIG. 4A, the respective air-excess rates in the first and sixth combustion strokes are switched to λ2. The first and sixth combustion strokes are performed in #1 and #3, respectively. Note that, since the air-excess ratios of the cylinder #1 to the cylinder #4 are controlled to be λ1, L=0 and 15 R=0% are satisfied prior to starting the transfer process.

Figure 4B:
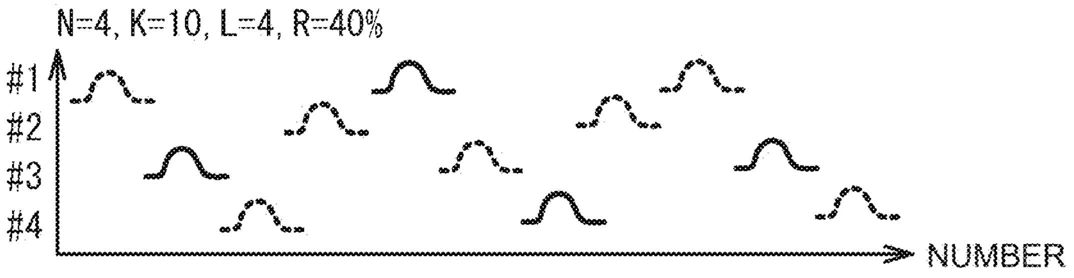
FIG. 4B is an explanatory view showing combustion strokes at λ1 and λ2 in the transfer process.

In the time t2, the second process is executed. As shown in FIG. 4B, in the second process, L=4 and R=40%. In the example of FIG. 4B, the respective air-excess rates in the second, fifth, seventh, and tenth combustion strokes are switched to λ2. The second, fifth, seventh, and tenth combustion strokes are performed in the cylinder #3, the #1, the #4, and the #3, respectively.

Figure 4C:
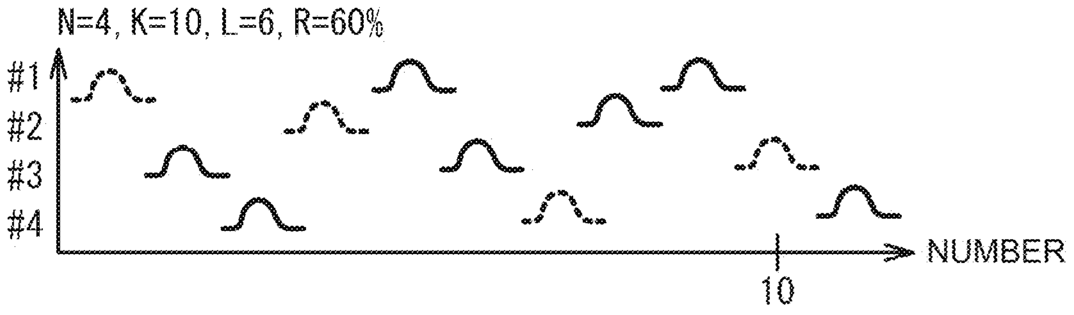
FIG. 4C is an explanatory view showing combustion strokes at λ1 and λ2 in the transfer process.

In the time t3, the third process is executed. As shown in FIG. 4C, in the third process, L=6 and R=60%. In the example in FIG. 4C, the air-excess rates in the second, third, fifth, sixth, eighth, and ninth combustion strokes are switched to λ2. The second, third, fifth, sixth, eighth, and ninth combustion strokes are performed in the cylinder #3, the #4, the #1, the #3, the #2, and the #1, respectively.

Figure 4D:
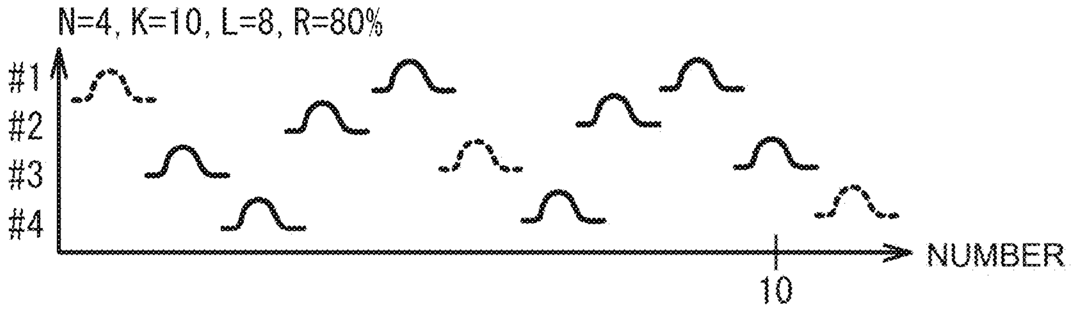
FIG. 4D is an explanatory view showing combustion strokes at λ1 and λ2 in the transfer process.

In the time t4, the fourth process is executed. As shown in FIG. 4D, in the fourth process, L=8 and R=80%. In the example of FIG. 4D, the respective air-excess rates in the second to fifth and seventh to tenth combustion strokes are switched to λ2. The second to fifth combustion strokes are performed in the cylinder #3, the #4, the #2, and the #1, respectively. The seventh to tenth combustion strokes are performed by the cylinder #4, the #2, the #1, and the #3, respectively. Note that, for each of the first to fourth processes, the combustion strokes of K times may be executed for only one cycle, or may be executed for a plurality of cycles. Further, each of the first process to the fourth process may be executed at a different cycle.

In the time t5, the air-excess ratio of all of the cylinder #1 to the cylinder #4 is switched to λ2, and L=10 and R=100%. As described above, R increases over 5 stages of R=20%, 40%, 60%, 80%, and 100%. Therefore, the torque shock during the execution of the transition process is suppressed.

For example, it is assumed that one of the cylinder #1 to the cylinder #4 is sequentially switched to λ2. In this case, N=M=4, R=25%, 50%, 75%, 100%. Thus, R increases over four stages depending on the number of cylinders. Therefore, the torque shock may be increased as compared with the above-described embodiment. In the above embodiment, R can be increased over a plurality of stages without depending on the number of cylinders, and torque shock is further suppressed.

Here, it is conceivable to gradually change the air-excess ratios of the cylinder #4 from all the cylinder #1 from λ1 to λ2 in order to suppress the torque shock. However, such a gradual change in the air-excess rate may lead to increased emissions of NOx. For example, from the stoichiometric air-fuel ratio to a predetermined lean air-fuel ratio, oxidation of nitrogen in the air is promoted due to an increase in the combustion temperature and excessive oxygen concentration, and the emission of NOx increases. At higher air-fuel ratios, the burning temperature decreases and the emission of NOx decreases. When the air excess ratio is gradually changed from λ1 to λ2 in this way, the air-fuel ratio passes through an area where the discharge of NOx increases. In the transition process of the present embodiment, the air excess rates of the cylinder #1 to the cylinder #4 are controlled to be λ1 or λ2, and the air-fuel ratio does not pass through an area where the discharge rate of NOx increases. Therefore, the amount of NOx discharged is also suppressed while the torque-shock is suppressed.

In the first process shown in FIG. 4A, K=10 and L=2 as described above. Where 2 is other than 1, other than 10, and is an approximate number of 10. In the first process, the first and sixth combustion strokes are switched to λ2. Here, between the first combustion stroke and the sixth combustion stroke, four combustion strokes at λ1 are performed. That is, in the first process, the combustion strokes at λ2 are performed at equal intervals. Since L is thus about a number of K, the combustion strokes at λ2 can be performed at equal intervals. Thus, the torque shock at the time of execution of the first process is suppressed.

In the fourth process shown in FIG. 4D, K=10 and L=8 as described above. Assuming that the number of combustion strokes at λ1 is J, J=2. Where 2 is other than 1, other than 10, and is an approximate number of 10. In the fourth process, the first and sixth combustion strokes are maintained at λ1. Here, between the first combustion stroke and the sixth combustion stroke, four combustion strokes at λ2 are performed. That is, in the fourth process, the combustion strokes at λ1 are performed at equal intervals. Since L is thus about a number of K, the combustion strokes at λ2 can be performed at equal intervals. Thus, the torque shock at the time of execution of the fourth process is suppressed.

FIG. 3 illustrates a transition process when the intake air amount Ga is constant, but the present disclosure is not limited thereto. Further, when there is a demand to increase the power of the engine 10, the intake air amount Ga is increased to the upper limit while maintaining the air excess rate constant, and then the transition process may be executed while maintaining the intake air amount Ga to the upper limit value.

In the above examples, the ratio R was increased over five steps, but the present disclosure is not limited thereto. For example, the ratio R may be increased over 10 steps. K=10 is not limited. K may be larger than the number of cylinders N. For example, K=5. In this case, the ratio R is increased over five steps.

Alternative Embodiment

Figure 5A:
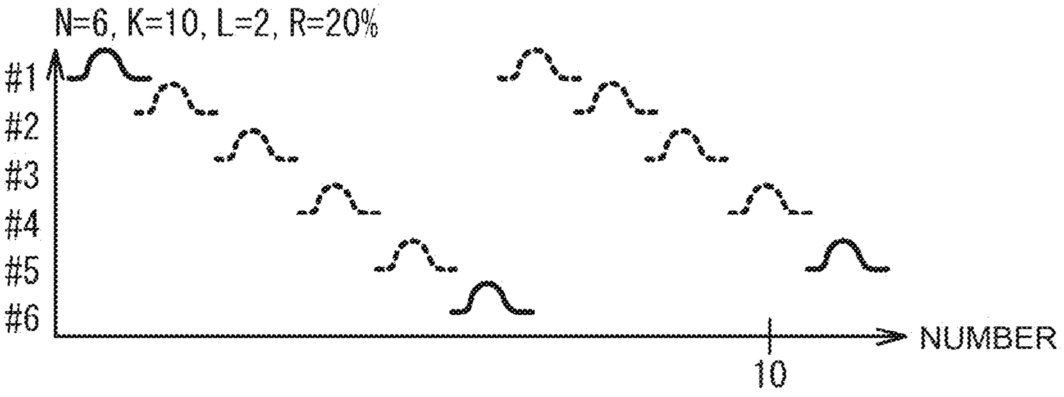
FIG. 5A is an explanatory diagram showing the combustion strokes at λ1 and λ2 in the transition process in the modified example.
Figure 5B:
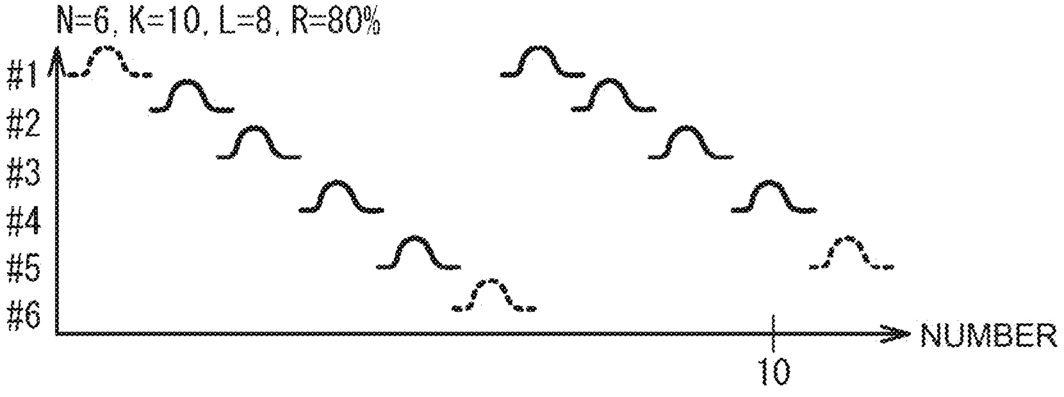
FIG. 5B is an explanatory view showing combustion strokes at λ1 and λ2 in the transition process in a modification.

Next, a transition process in the V-type 6-cylinder engine will be described. In the V-type 6-cylinder engine, the cylinder #1, the #3, and the #5 are provided in the left bank, and the cylinder #2, the #4, and the #6 are provided in the right bank. Cylinder #1, #2, #3, #4, #5, burning in the order of the #6 is performed. In this variation, N=6, K=10, M=7, L=1, 2, 4, 5, 7, 8, and 10. The ratio R increases over seven stages greater than the number of cylinders N. Thus, the torque shock is suppressed. FIGS. 5A and 5B are explanatory diagrams showing the combustion strokes of λ1 and λ2 in the transition process in the modification.

FIG. 5A illustrates the situation where R=20%. In the example of FIG. 5A, the first and sixth combustion strokes are switched to λ2. The first and sixth combustion strokes are performed at #1 and #6, respectively. In this process, the combustion strokes at λ2 are performed at equal intervals. Thus, the torque shock is suppressed.

FIG. 5B illustrates the situation where R=80%. In the example of FIG. 5B, the respective air-excess rates in the second to fifth and seventh to tenth combustion strokes are switched to λ2. Assuming that the number of combustion strokes at λ1 is J, J=2. Where 2 is other than 1, other than 10, and is an approximate number of 10. In this process, the combustion strokes at λ1 are performed at equal intervals. Thus, the torque shock at the time of execution of the present processing is suppressed.

Although the embodiments of the present disclosure have been described in detail above, the present disclosure is not limited to such specific embodiments, and various modifications and changes can be made within the scope of the gist of the present disclosure described in the claims.

What is claimed is:

1. An engine control device comprising a processor configured to:
- control an air excess rate of each of N cylinders by controlling an intake air amount and a fuel injection amount of each of the N cylinders;
- determine whether there is a request to switch the air excess rate controlled to λ1 to a λ2 different from λ1; and
- in response to determining that there is the request to switch the air excess rate controlled to λ1 to the λ2, execute a transition process, the transition process including controlling the air excess rate such that a proportion of L combustion strokes at the λ2 to consecutive K combustion strokes increases from 0% to 100% in M steps, wherein
- N is an integer of 2 or more,
- K is an integer greater than N, and
- M is an integer greater than N.

2. The engine control device according to claim 1, wherein:
- L is a divisor of K other than 1 and other than K; and
- the processor is further configured to execute combustion strokes at the λ2 at equal intervals in the transition process.

3. The engine control device according to claim 1, wherein:
- J obtained by subtracting L from K is a divisor of J other than 1 and other than K; and
- the processor is further configured to execute combustion strokes at λ1 at equal intervals in the transition process.

4. The engine control device according to claim 1, wherein:
- one of the excess rates λ1 and the λ2 is 1.0 or more;
- the other of the excess rates λ1 and the λ2 is 1.5 or more;
- N is 4 or more; and
- M is 5 or more.

5. The engine control device according to claim 1, wherein the processor is further configured to execute the transition process with a constant intake air amount.

6. The engine control device according to claim 1, wherein the processor is further configured to:
- determine that there is the request to switch the air excess rate in response to receiving a request to increase power of an engine;
- increase the intake air amount to an upper limit; and then
- execute the transition process with the intake air amount at the upper limit.

* * * * *